[11] 3,578,838

[72] Inventor James N. Hallock
 Watertown, Mass.
[21] Appl. No. 853,856
[22] Filed Aug. 28, 1969
[45] Patented May 18, 1971
[73] Assignee The United States of America as represented by the Administrator of the National Aeronautics and Space Administration

[54] MULTIPLE HOLOGRAM RECORDING AND READ OUT SYSTEM
 4 Claims, 3 Drawing Figs.
[52] U.S. Cl. .................................................. 350/3.5
[51] Int. Cl. ............................................. G02b 27/22
[50] Field of Search .......................................... 350/3.5

[56] References Cited
 UNITED STATES PATENTS
 3,296,594  1/1967  Van Heerden ............... 350/3.5UX OTHER REFERENCES
Vitols, IBM TECH. DISCLOSURE BULLETIN Vol. 8, p. 1581— 3 (4/1966)
DE et al., " Three-Beam Holography," APPLIED PHYSICS LETTERS, Vol. 10 No. 3 pp. 78— 79 (2/1967)

*Primary Examiner*—David Schonberg
*Assistant Examiner*—Robert L. Sherman
*Attorneys*—Herbert E. Farmer, John R. Manning and Garland T. McCoy ABSTRACT: An information recording and readout system is presented wherein multiple holograms are recorded in a single hologram recording medium by the use of three intersecting light beams and a lens system. Hologram patterns are formed by adding a third intersecting light beam to the two intersecting light beams normally used in hologram formation. The location of the third beam is changed for each different hologram to be formed on the medium. Readout, for the case of pattern identification, is accomplished by presenting patterns to the holographic medium and recreating and sensing the position of the third beam.

INVENTOR
JAMES N. HALLOCK

BY
ATTORNEYS

MULTIPLE HOLOGRAM RECORDING AND READ OUT SYSTEM

ORIGIN OF THE INVENTION

The invention described herein was made by an employee of the U.S. Government and may be manufactured and used by or for the Government for governmental purposes without the payment of any royalties thereon or therefor.

BACKGROUND OF THE INVENTION

1. Field of the Invention

The present invention relates to the field of holographic information storage and retrieval. More particularly, this invention relates to the field of information storage through the formation of multiple holograms in a single recording medium and information retrieval through the identification of the existence and location of information stored in a multiple pattern hologram recording medium. Accordingly, the general objects of the present invention are to provide novel and improved methods and apparatus of such character.

2. Description of the Prior Art

Hologram formation through the intersection of coherent signal and reference beams is well known in the art and has become of particular significance since relatively high power, coherent laser light sources have become available. Furthermore, it has been suggested in the art that more than 1 hologram pattern can be formed on or stored in a single hologram recording medium, such as a photographic plate, through the use of the Bragg angle technique wherein the angular relationship between the signal and reference beams and the recording medium is varied for each different hologram pattern to be formed. However, the requirement for movement or angular reorientation of either the signal and reference beam generating means or the recording medium, as present in the Bragg angle technique, introduces undesired complications in recording the readout; especially in systems where it is desired to perform a pattern identification activity.

SUMMARY OF THE INVENTION

The present invention provides a multiple hologram recording and readout system in which multiple patterns can be stored in a single hologram and readout without the need to move either the recording medium or signal and reference beam sources. Furthermore, the present invention provides a pattern identification system wherein multiple patterns can be holographically recorded in a single recording medium and then selectively identified by the unique position of a light signal. In accordance with the present invention, the standard signal and reference beams normally used in the formation of a hologram are supplemented by a third beam which has a unique position for each pair of signal and reference beams and which intersects the signal and reference beams at the hologram medium. The three beams thus form a unique interference pattern corresponding to each information pattern to be stored. Pattern identification may accordingly be accomplished by presenting a search pattern to the hologram medium and thereby recreating and sensing the unique position of the third light beam.

Accordingly, one object of the present invention is to provide a novel and improved holographic recording and readout system wherein multiple holograms can be stored in and readout from a single recording medium.

Another object of the present invention is to provide a novel and improved holographic recording and readout system wherein multiple holograms can be stored in and readout from a single hologram medium without the need for any movement of the recording medium.

Still another object of the present invention is to provide a novel and improved hologram recording and readout system particularly adapted for pattern recognition.

Still another object of the present invention is to provide a novel and improved hologram recording system particularly suitable for star pattern identification.

Still another object of the present invention is to provide a novel and improved hologram recording and readout system particularly suitable for a star mapping system.

Other objects and advantages will be apparent to and understood by those skilled in the art from the following detailed description and drawings.

BRIEF DESCRIPTION OF THE DRAWINGS

In the drawings, wherein like elements are numbered alike in the several FIG..

DESCRIPTION OF THE PREFERRED EMBODIMENT

Figure 1:
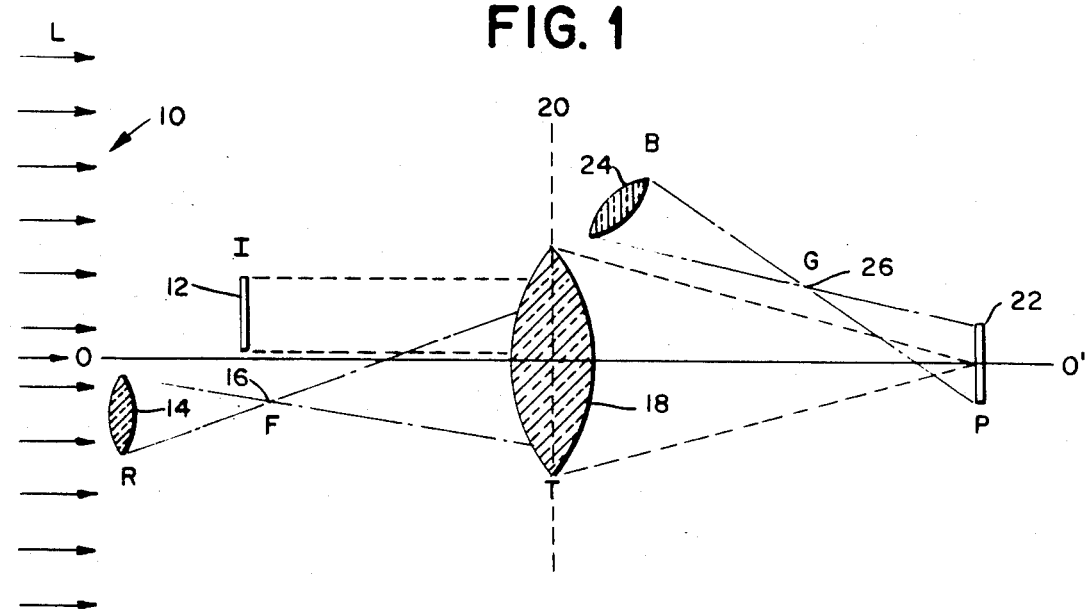
FIG. 1 is a schematic representation of a multiple hologram recording in accordance with the technique of the present invention.
Figure 2:
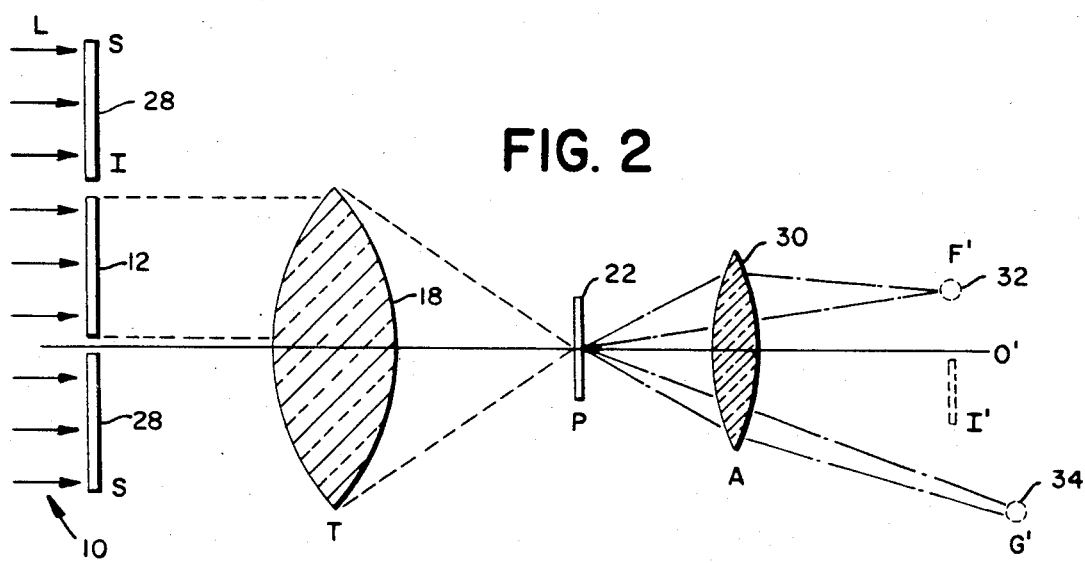
FIG. 2 is a schematic representation of pattern identification and information readout in accordance with the present invention.

FIGS. 1 and 2 schematically show the general concept of pattern storage and identification employing a three-beam technique in accordance with the present invention. The general concept will first be discussed and explained with reference to FIGS. 1 and 2, and then a star mapper embodiment will be discussed with reference to FIG. 3.

Referring first to FIG. 1, a laser light beam 10 (also indicated as L) is delivered to an information bearing element 12 (also indicated as I) which will typically be a transparency having a desired pattern thereon. Laser light 10 is also delivered to a Rayleigh lens 14 (also indicated as R), and lens 14 focuses the light incident thereon to a point 16 (also indicated as F), which point 16 should preferably, but need not necessarily, be in the same plane as transparency 12 (i.e. the same plane normal to axis 0–0' of the system). The light passing through lens 14 diverges from point 16 and is incident, along with the light passing through transparency 12, on a Fourier transform lens 18 (also indicated as T). While not necessary, in the interest of convenience the midplane or axis 20 of lens 18 is spaced from transparency 12 a distance equal to one focal length of lens 18. A hologram recording plate 22 (also indicated as P) is located on the other side of lens 18 at a distance from lens 18 equal to one focal length of lens 18. The Fourier transform of the pattern on transparency 12 and the beam of light emanating from point 16 are delivered to plate 22 and form an interference pattern thereon to create a hologram.

Except for the fact that the system described thus far incorporates lenses, a hologram thus formed would be equivalent to a typical prior art hologram wherein the light passing through transparency 12 constitutes the signal beam and the light emanating from point source 16 constitutes the reference beam. However, the present invention introduces a third light beam used in the formation of the hologram. A lens 24 (also indicated as B) focuses a part of light 10 at a point 26 (also indicated as G) in front of plate 22. The light passing through lens 24 will be incident on plate 22 and will appear to emanate from a point source located at point 26. The position of point 26 is uniquely selected for each particular hologram to be formed on plate 22, and thus a hologram is formed on plate 22 commensurate with both the pattern on transparency 12 and the particular location of point 26.

In accordance with prior art techniques, wherein the third beam would not be present in the system, if it were desired to store another pattern in plate 22, plate 22 would be rotated through some finite angle about an axis perpendicular to axis 0–0' and then another signal beam and the reference beam would be directed to the surface of the newly positioned plate. However, in accordance with the present invention, the position of plate 22 remains constant but lens 24, and hence the third beam formed by that lens, is moved for each new information pattern to be stored. In moving lens 24 the distance between axis 0–0' and the center of the lens 24 is maintained constant. That is, the lens 24 is rotated in a plane perpendicular to axis 0–0' so that the center of lens 24 will always fall on a circle about axis 0–0'. Point 26 will thus also always be on a circle about axis 0–0' and will also remain a constant distance from the face of plate 22. In order to store a second hologram, transparency 12 will be replaced by another transparency bearing a different information pattern and lens B will be moved to a new station. The interaction of the three light beams; i.e. the beam passing through the new transparency, the beam emanating from point 16, and the beam emanating from the new point 26; will thus define a unique interference pattern on plate 22 thereby defining another hologram. This technique may be repeated a desired number of times, limited only by the capacity of plate 22, so that a plurality of holograms may be formed on plate 22; each of the holograms having a particular relationship between the pattern being recorded and the position of point 26.

With respect to the system shown in FIG. 1, it will be understood that the laser light 10 is collimated and may be caused to be incident on lenses 14 and 24 and transparency 12 by any desired technique, such as selective masking or beam splitting.

Referring now to FIG. 2, information read out in accordance with the present invention is schematically illustrated. As is well known in the art, the information on the signal beam can be recreated from the hologram recording medium by illuminating the recording medium with the reference beam. As is also well known in the art, read out is reciprocal in the sense that the reference beam will be recreated if the hologram is illuminated with the signal beam. The third beam in the present invention, i.e. the beam emanating from point 26, constitutes, in effect, a supplemental reference beam, and pattern identification in accordance with the present invention is accomplished by recreating and determining the location of that supplemental reference beam.

As shown in FIG. 2, light 10 is caused to be incident on and passed through a transparency 12 which bears an unknown pattern identical to one of the patterns or a part of a pattern used in forming a hologram in accordance with the technique described with respect to FIG. 1. Pattern 12 is located in a window defined by stops 28; the use of the window being in the interest of preventing other parts of the collimated light beam 10 from interfering with the read out technique. The light passing through transparency 12 is delivered to lens 18 which performs a Fourier transform and delivers the transform of the transparency pattern, as an image, to hologram plate 22 located at the focal plane of lens 18. The transform (image) considered on plate 22 will correspond to a transform previously incident on the plate during information storage, and thus an output will be generated from plate 22. That output is delivered to another lens 30 spaced one focal length from the plane of plate 22 (also indicated as A), and lens 30 performs another Fourier transform and exhibits the autocorrelation of the pattern on transparency 12 with all the stored patterns in plate 22 as a point of light 32 (also indicated as F'). Using prior art techniques, one would have had to rotate the photographic plate 22 in order to search for the formation of point 32, and the angle of plate 22 would then have indicated the identity of the pattern on transparency 12. However, in accordance with the present invention point 32 is formed without any movement of plate 22, and another point of light 34 (also indicated as G') is formed. Point 32 F' is the image of pint 16 F of FIG. 1, and point 34 G' is the image of point 26 G of FIG. 1 for the particular pattern present on the transparency being interrogated. The position of point 34 is unique for the particular pattern being interrogated, and another unknown pattern corresponding to a previously recorded pattern will generate another point 34 at a different location on a circle about axis 0–0'. Thus, the position of the generated point 34 identifies the particular information pattern, if any, with which it is associated and the unknown pattern can accordingly be identified by sensing the position of point 34. In this manner, the patterns stored in plate 22 can be interrogated by a series of unknown patterns on sample transparencies 12 without movement of plate 22.

Figure 3:
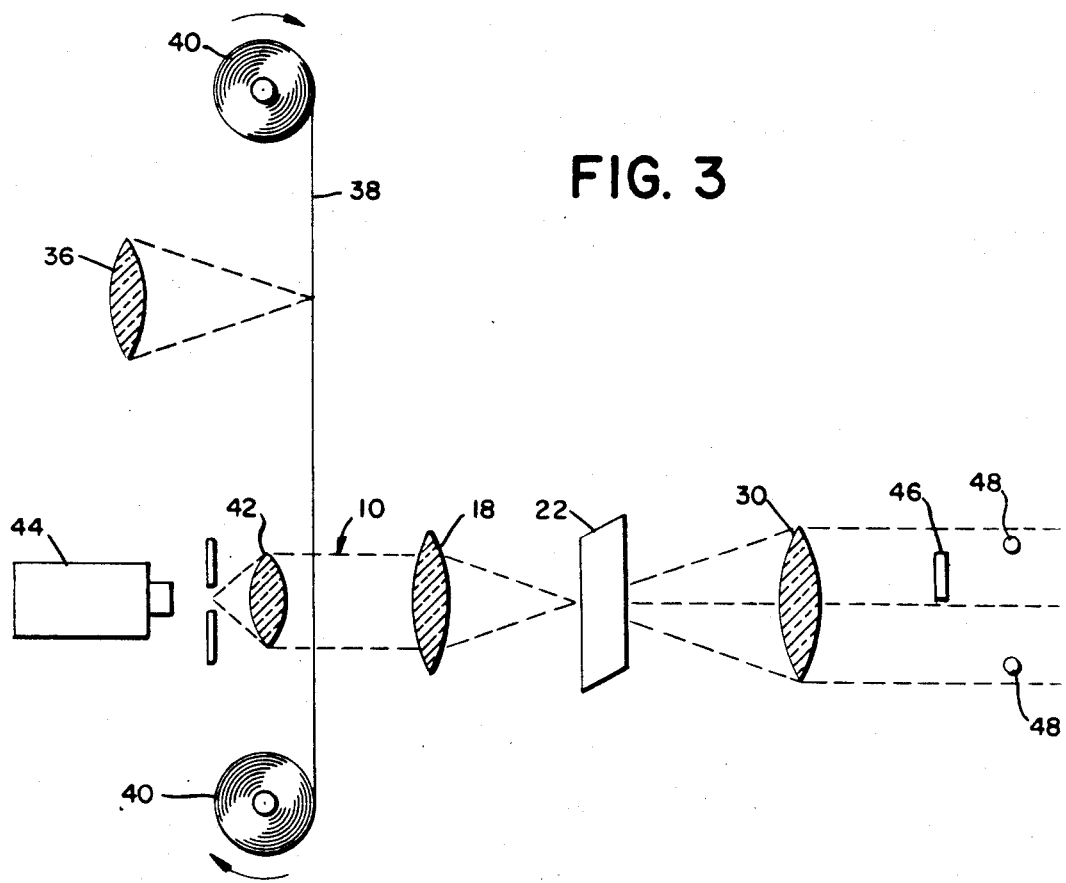
FIG. 3 is a schematic representation of a star pattern identification system in accordance with the present invention.

Referring now to FIG. 3, the present invention is shown schematically by way of an example of one type of possible application, as a star mapper for guidance and attitude control in a space craft. The system of FIG. 3 has a holographic memory plate 22 on which has been formed a large number of holograms in accordance with the technique described with respect to FIG. 1. These holograms are holograms of various star patterns, and they may be formed in a laboratory in accordance with the technique of FIG. 1 by using transparencies consisting of holes arranged to conform to various star patterns whereby the transparencies represent patterns of point sources of light, each of which patterns is coordinated with a particular location of a point 26 in forming a hologram. A telescope 36 delivers the star pattern within its field of view to a recording medium such as film 38. It will, of course, be understood that the recording medium is not limited to film but could be any other suitable recording medium, either permanent or erasable. The star pattern within the field of view of telescope 36 is recorded on film 38 and constitutes an unknown pattern to be identified. The recorded pattern is then transported, as by means of reels 40, into the path of laser light beam 10 formed by a collimating lens 42 from the output of laser 44. The image of the unknown pattern is, accordingly, delivered to transform lens 18 whereby the Fourier transform thereof is caused to be incident on holographic plate 22. If the unknown pattern being illuminated by light 10 has been previously used in storing a hologram in plate 22, an output will be generated, as previously described with respect to FIG. 2, and delivered to imaging lens 30 whereby points 32 and 34 will be generated. As previously described, the location of point 34 is unique with respect to and particularly identifies a specific previously recorded hologram pattern. A mosaic detector 46, or any position sensitive detector, is positioned to detect the existence of and location of any point 32. A ring of photodiodes 48, only two of which are shown in FIG. 3, is positioned to detect the existence of and location of any point 34. Any photodiode in the ring thus energized can be correlated with the specific location of point 34 thereby identifying the particular star pattern being examined. The outputs from the mosaic detector and the diode ring can be used as a control input to an attitude control system of the space craft.

As a point of interest, it should be noted that the presence of the lenses in the present system significantly increases the flexibility of the system and eliminates or reduces alignment problems. That is, information anywhere within the field of view of any of the lenses can be effectively utilized in the system since it will be passed through the focal point of the lens, and thus successful operation of the present system does not require precise alignment between the position of the unknown pattern and the holographic memory as compared to the alignment between the pattern and the memory when forming the hologram in order for the system to operate effectively.

While a preferred embodiment has been shown and described, various modifications and substitutions may be made without departing from the spirit and scope of this invention. Accordingly, it is to be understood that this invention has been described by way of illustration and not limitation.

I claim:

1. Apparatus for recording a plurality of signal patterns on a single hologram comprising:
   means for generating a first beam of light, said first beam being an information signal pattern light beam;
   means for generating a second beam of light, said second beam being a reference light beam;
   hologram recording means;
   Fourier transform lens means positioned to receive said first and second beams and deliver an interference pattern of said first and second beams to said hologram recording means; and means for generating a third beam of light, said third beam being a supplemental reference beam moveable with respect to said recording means for delivering a point source of light having a unique position for each signal pattern recorded on said hologram recording means contemporaneously with the delivery of each of said interference patterns to said hologram recording means whereby a hologram is formed commensurate with the information in said first and second light beams and with the position of said third beam, said first, second and third beams being mutually coherent.

2. The apparatus as defined in claim 1 which further comprises:
means for delivering an unknown signal pattern light beam to said recorded means; and
means for identifying and correlating said unknown signal pattern with a specific signal pattern previously recorded including means for generating an output from said recorded hologram including a first light beam imaging said unknown pattern, a second light beam identifying a previously recorded pattern matching the unknown pattern and a third light beam referencing a particular portion of the corresponding pattern previously recorded.

3. A method of recording a plurality of holograms on a single recording means comprising the steps of:
generating a first beam of light, said first beam being an information bearing signal light beam;
generating a second beam of light, said second beam being a reference light beam;
delivering said first and second beams to a lens to form an interference pattern of said first and second beams;
delivering said interference pattern of said first and second beams to a hologram recording means; and
generating a third beam of light, said third beam being a supplemental reference beam and moveable for delivering a point source of said third beam of light to said hologram recording means contemporaneously with the delivery of said interference pattern to said hologram recording means whereby a hologram is formed commensurate with said first, second and third light beams, said first, second and third beams being mutually coherent; and
moving said third beam with respect to said recording means for each subsequent signal pattern recorded.

4. The method as defined in claim 3 which further includes the steps of:
delivering an unknown signal pattern to the recording means having a plurality of stored holograms;
generating a read out search pattern having information commensurate with information on a stored hologram;
delivering said search pattern to said recording means to generate a read out signal of said third beam; and
detecting the position of said third beam to identify said search pattern.